(12) United States Patent
Lu et al.

(10) Patent No.: US 11,223,176 B2
(45) Date of Patent: Jan. 11, 2022

(54) DIRECT-CURRENT MOTOR COMMUTATOR STRUCTURE AND DIRECT-CURRENT MOTOR

(71) Applicant: New United Rail Transit Technology Co., Ltd., Jiangsu (CN)

(72) Inventors: Niancheng Lu, Jiangsu (CN); Chang Jiang, Jiangsu (CN); Jun Wu, Jiangsu (CN); Yang Cao, Jiangsu (CN)

(73) Assignee: New United Rail Transit Technology Co., Ltd., Changzhou (CN)

( * ) Notice: Subject to any disclaimer, the term of this patent is extended or adjusted under 35 U.S.C. 154(b) by 474 days.

(21) Appl. No.: 16/337,932

(22) PCT Filed: Feb. 2, 2019

(86) PCT No.: PCT/CN2019/074526
§ 371 (c)(1),
(2) Date: Mar. 29, 2019

(87) PCT Pub. No.: WO2020/034606
PCT Pub. Date: Feb. 20, 2020

(65) Prior Publication Data
US 2021/0328397 A1 Oct. 21, 2021

(30) Foreign Application Priority Data
Aug. 14, 2018 (CN) .......................... 201810920779.7

(51) Int. Cl.
*H01R 39/04* (2006.01)
*H02K 13/04* (2006.01)
*H02K 13/00* (2006.01)

(52) U.S. Cl.
CPC ........... *H01R 39/04* (2013.01); *H02K 13/006* (2013.01); *H02K 13/04* (2013.01)

(58) Field of Classification Search
CPC ...... H01R 39/04; H01R 39/045; H01R 39/14; H01R 43/06; H02K 13/006; H02K 13/04;
(Continued)

(56) References Cited

U.S. PATENT DOCUMENTS 2,426,042 A * 8/1947 Mueller ................. H01R 39/04
310/236
2,501,370 A 3/1950 Wright et al.
(Continued)

FOREIGN PATENT DOCUMENTS

| CN | 2731791 Y | 10/2005 |
|----|-----------|---------|
| GB | 677707 A | 8/1952 |

OTHER PUBLICATIONS

First Office Action of Counterpart Chinese Patent Application No. 201810920779.7 dated Sep. 28, 2018.

*Primary Examiner* — Quyen P Leung
*Assistant Examiner* — Alexander A Singh

(57) ABSTRACT

A direct-current motor commutator structure includes: a commutator base, comprising a front pressing ring, a pressing plate and a sleeve that are sequentially abutted, a sealing ring being provided between the front pressing ring and the pressing plate, and between the pressing plate and the sleeve constituting a bearing area; a commutator, mounted in the bearing area and having opposite first and second portions; a sealing element being potted or provided between the second portion and the sleeve; an equalizing cable, mounted on an outer side of a first potting area formed by the first portion, the pressing plate and the front pressing ring, abutting against the first portion and the front pressing ring, and covering the first potting area; and an armature coil, clinging to the equalizing cable and located on an outer side of a second potting area formed by the equalizing cable and the front pressing ring.

20 Claims, 3 Drawing Sheets

(58) Field of Classification Search
CPC ...... H02K 13/00; H02K 13/10; H02K 13/105; H02K 13/08
USPC ................ 310/233, 234, 235, 236, 237, 238
See application file for complete search history.

(56) References Cited

U.S. PATENT DOCUMENTS

| | | | | |
|---|---|---|---|---|
| 2,899,574 | A | * | 8/1959 | Jungk .................... H01R 39/04 310/234 |
| 4,385,253 | A | * | 5/1983 | Gruenwald ............ H01R 39/04 310/235 |
| 5,668,428 | A | * | 9/1997 | Stojkovich ............. H01R 39/04 310/233 |

\* cited by examiner

US 11,223,176 B2

DIRECT-CURRENT MOTOR COMMUTATOR STRUCTURE AND DIRECT-CURRENT MOTOR

CROSS-REFERENCE TO RELATED APPLICATIONS

The present disclosure claims the priority of the Chinese patent application No. 201810920779.7, filed with the Chinese Patent Office on Aug. 14, 2018 and entitled "Direct-current Motor Commutator Structure and Direct-current Motor", which is incorporated herein by reference in its entirety.

TECHNICAL FIELD

The present disclosure relates to the technical field of commutators, and particularly to a direct-current motor commutator structure and a direct-current motor.

BACKGROUND ART

The downstream industries of motors, which are indispensable essential equipment in industry, transportation, national defense and daily life, include almost all the fundamental industries of national economy. As one of the core components of motors, commutators are also developing increasingly along with the development of the motor industry.

Specifically, as an important component of a direct-current motor, the commutator can automatically change the direction of the current through the coil, and then change the direction of the force applied to the coil, so that the coil continues rotating, and the commutator plays the role of ballasting, i.e., rectifying the alternating current in the armature winding of the direct-current motor into direct current, and outputting direct current at both ends of the positive and negative electric brushes.

However, the existing commutators have some problems when in use.

SUMMARY

An object of the present disclosure is to provide a direct-current motor commutator structure, which can effectively alleviate the technical problem of dust and dirt accumulation between a sleeve and a pressing ring, and can avoid damaging of the commutator or at least can lower the rate of damaging of the commutator.

Another object of the present disclosure is to provide a direct-current motor, comprising the above-described direct-current motor commutator structure and having all the features of the direct-current motor commutator structure.

Embodiments of the present disclosure are implemented as follows:

An embodiment of the present disclosure provides a direct-current motor commutator structure, comprising:

a commutator base comprising a front pressing ring, a pressing plate and a sleeve that are abutted in sequence, a sealing ring being provided at the abutment between the front pressing ring and the pressing plate, and at the abutment between the pressing plate and the sleeve, and the pressing plate and the sleeve constituting a bearing area;

a commutator, mounted in the bearing area and having a first portion and a second portion that are opposite to each other, wherein the first portion, the pressing plate and the front pressing ring form a first potting area, and a sealing element is potted or provided between the second portion and the sleeve;

an equalizing cable, mounted on an outer side of the first potting area, the equalizing cable abutting against the first portion and the front pressing ring and covering the first potting area, and the equalizing cable and the front pressing ring forming a second potting area in a surrounding manner; and an armature coil, clinging to the equalizing cable and located on an outer side of the second potting area.

In addition, the direct-current motor commutator structure according to an embodiment of the present disclosure may also have the following additional technical features:

In an alternative embodiment of the present disclosure, the direct-current motor commutator structure comprises a pressing assembly comprising a nut and a stop screw, the nut is configured to press the front pressing ring towards a rotor core of the direct-current motor, and the stop screw is disposed on one side of the nut away from the rotor core.

In an alternative embodiment of the present disclosure, when a sealing element is provided between the second portion and the sleeve, the sealing element is a polytetrafluoroethylene sealing element.

In an alternative embodiment of the present disclosure, the second portion comprises a first boss, the sleeve comprises a second boss, the first boss and the second boss are adjacent to each other and have a spacing therebetween, and the sealing element fills up the spacing.

In an alternative embodiment of the present disclosure, the direct-current motor commutator structure further comprises a balancing block, the balancing block is disposed on the sleeve, and the balancing block is located at a portion of the sleeve where the second boss is disposed, and located on one side of the sleeve away from the sealing element.

In an alternative embodiment of the present disclosure, an outer surface of the commutator has a groove.

In an alternative embodiment of the present disclosure, a plurality of grooves are provided in an extending direction of the outer surface of the commutator.

In an alternative embodiment of the present disclosure, the plurality of grooves are disposed at equal intervals.

In an alternative embodiment of the present disclosure, the first portion comprises a mounting groove, and the equalizing cable and the armature coil are sequentially pressed into the mounting groove and are sequentially fixedly connected.

In an alternative embodiment of the present disclosure, the equalizing cable and the armature coil are sequentially pressed into the mounting groove and are sequentially welded.

In an alternative embodiment of the present disclosure, the armature coil is proximate to the front pressing ring, the armature coil and the front pressing ring have a gap therebetween, and the direct-current motor commutator structure further comprises an arc-shaped insulation that is disposed in the gap and separates the armature coil from the front pressing ring.

In an alternative embodiment of the present disclosure, the pressing plate and the sleeve are connected by a bolt that causes the sleeve to press against the pressing plate.

In an alternative embodiment of the present disclosure, the first portion and the second portion are arranged in a manner of being perpendicular to each other.

In an alternative embodiment of the present disclosure, one end of the second portion close to the sleeve is provided with a protrusion, and a clamping groove configured to be in clamping connection with the protrusion is formed between the sleeve and the pressing plate.

In an alternative embodiment of the present disclosure, the protrusion has a trapezoid-shaped section, and the clamping groove is mated with the trapezoid-shaped protrusion to be in clamping connection.

In an alternative embodiment of the present disclosure, the junction between the protrusion and the first portion is provided with a rounded transition.

In an alternative embodiment of the present disclosure, four end points of the trapezoid-shaped protrusion are all provided with rounded corners for transition.

An embodiment of the present disclosure provides a direct-current motor, comprising the direct-current motor commutator structure as described in any one of the above items.

An embodiment of the present disclosure provides a method of mounting a direct-current motor commutator structure, comprising the steps of:

making a front pressing ring abut and press against one side of a rotor core of a direct-current motor;

making a pressing plate abut against the front pressing ring;

connecting a sleeve to the pressing plate by a bolt;

forming, after the mounting of a commutator, a first potting area and a second potting area by the commutator in cooperation with an equalizing cable and an armature coil that are mounted; and potting the first potting area and the second potting area.

In an alternative embodiment of the present disclosure, the step of making the front pressing ring abut and press against one side of a rotor core of a direct-current motor further comprises:

making the front pressing ring abut and press against one side of the rotor core of the direct-current motor by a nut, and holding the nut with a stop screw.

The advantageous effects of the present disclosure are as follows:

In the direct-current motor commutator structure, the fastening effect of the front pressing ring can be ensured by a nut and a stop screw, moreover, a sealing chain is constructed by two sealing rings, a polytetrafluoroethylene sealing element, a first potting area and a second potting area, which effectively prevents dust and dirt accumulation, and further, a groove is provided in the surface of the commutator, which effectively reduces electric sparks of the direct-current motor, so that the direct-current motor employing the direct-current motor commutator structure can have better working performance.

BRIEF DESCRIPTION OF DRAWINGS

In order to more clearly illustrate the technical solutions of the embodiments of the present disclosure, brief description is made below on the drawings required to be used in the embodiments. It should be understood that the following drawings only illustrate some of the embodiments of the present disclosure and therefore shall not be regarded as a limitation to the scope, and for a person of ordinary skills in the art, other related drawings may be obtained from these drawings without inventive effort.

REFERENCE SIGNS

Figure 1:
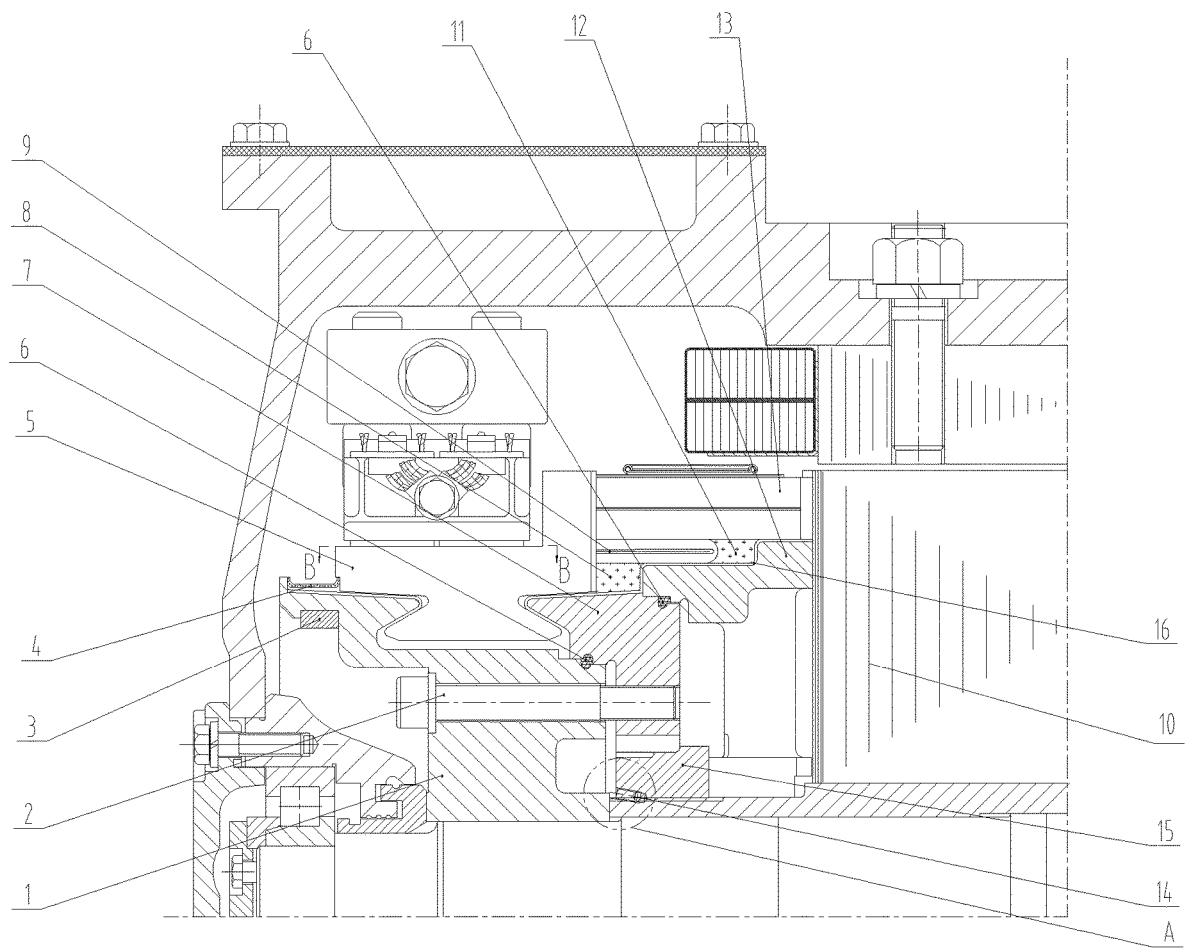
FIG. 1 is a schematic view of a direct-current motor commutator structure and environmental elements according to an embodiment of the present disclosure.

1—sleeve; 101—second boss; 2—bolt; 3—balancing block; 4—polytetrafluoroethylene sealing element; 5—commutator; 501—first portion; 502—second portion; 51—first boss; 52—groove; 6—sealing ring; 7—pressing plate; 8—first potting area; 9—equalizing cable; 10—rotor core; 11—second potting area; 12—front pressing ring; 13—armature coil; 14—stop screw; 15—nut; and 16—arc-shaped insulation.

DETAILED DESCRIPTION OF EMBODIMENTS

In order to make the objects, technical solutions and advantages of the embodiments of the present disclosure clearer, the technical solutions of the embodiments of the present disclosure will be described clearly and completely below with reference to the drawings of the embodiments of the present disclosure. Apparently, the embodiments described are some of the embodiments of the present disclosure, rather than all of the embodiments. The components of the embodiments of the present disclosure described and illustrated in the drawings herein can generally be arranged and designed in a variety of configurations.

Thus, the following detailed description of the embodiments of the present disclosure provided in the drawings is not intended to limit the scope of protection of the present disclosure, but is merely representative of the selected embodiments of the present disclosure. All the other embodiments that are obtained by a person of ordinary skills in the art without inventive effort on the basis of the embodiments of the present disclosure shall be covered by the scope of protection of the present disclosure.

It should be noted that like reference signs and letters denote like items in the drawings, and therefore, once a certain item is defined in one figure, it does not need to be further defined or explained in the following figures.

In the description of the present disclosure, it is to be noted that the orientation or position relation denoted by the terms such as "inner" and "outer" is based on the orientation or position relation indicated by the figures, or refers to the orientation or position relation in which the product of the present disclosure is normally placed when in use, which only serves to facilitate describing the present disclosure and simplify the description, rather than indicating or suggesting that the device or element referred to must have a particular orientation, and is constructed and operated in a particular orientation, and therefore cannot be construed as a limitation on the present disclosure. In addition, the terms such as "first" and "second" are only configured to differentiate description and cannot be understood as an indication or implication of relative importance.

In the description of the present disclosure, it should be further noted that unless otherwise explicitly specified and defined, the terms "arrange" and "connect" shall be understood in broad sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skills in the art could understand the specific meaning of the terms in the present disclosure according to specific situations.

Embodiment 1

During the operation of a direct-current motor, dust and dirt are easy to accumulate on the junction between the commutator and the sleeve and on the junction between the commutator and the pressing ring, and ionization of dust and dirt causes damages to the commutator.

In the prior art, it is a general practice to reduce air gaps by compressing the commutator, the sleeve and the pressing plate, thereby reducing dust and dirt accumulation at the bottom of the commutator, but the effect is not ideal.

Figure 2:
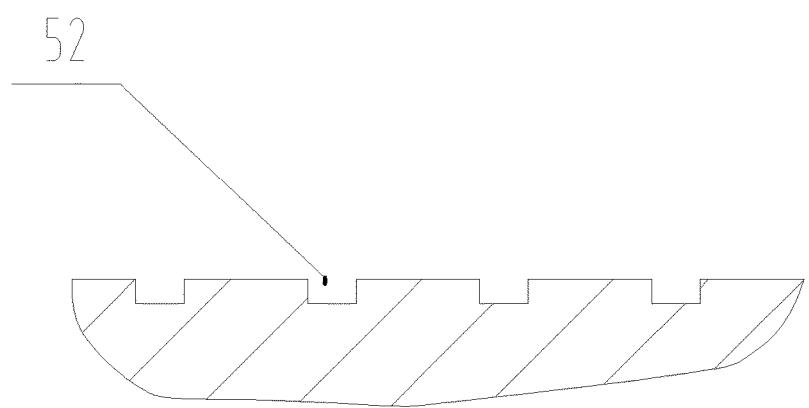
FIG. 2 is a partial sectional view taken in the direction B-B in FIG. 1.
Figure 3:
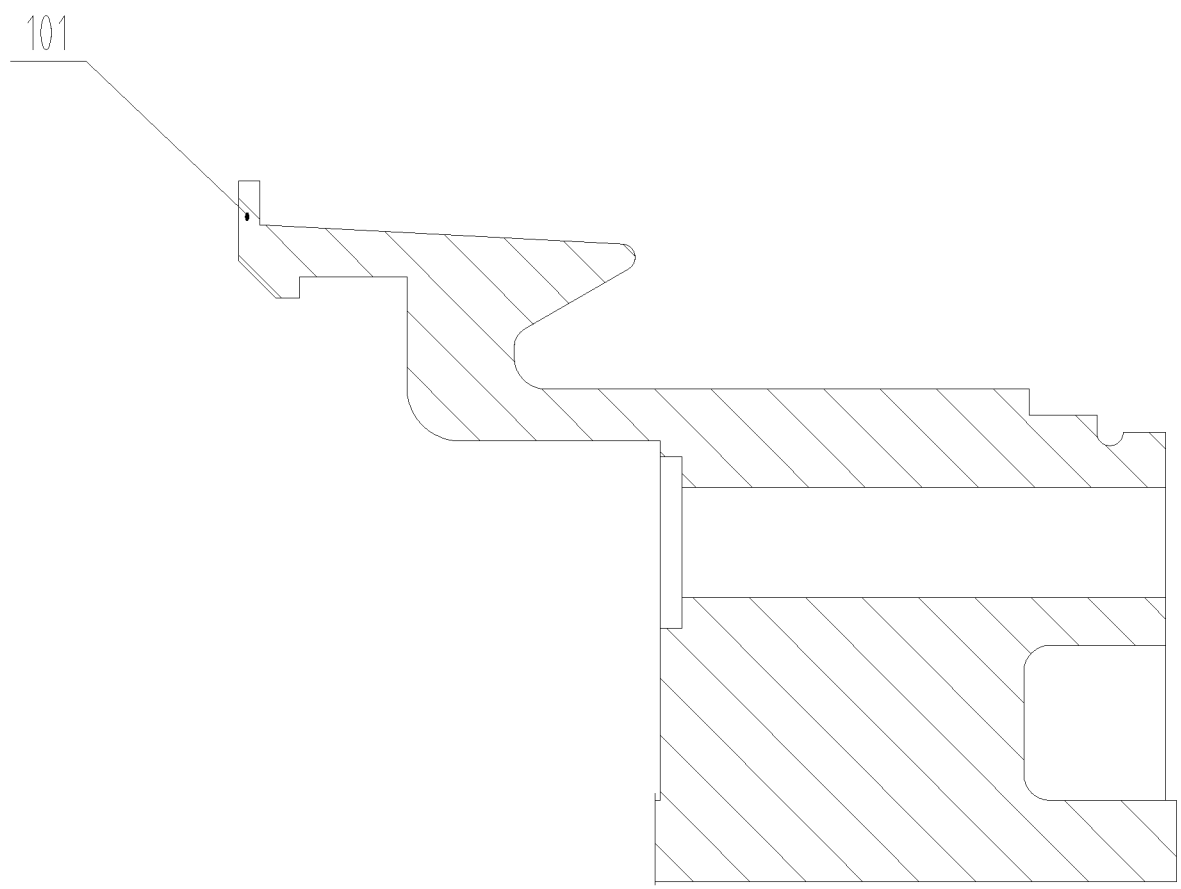
FIG. 3 is a sectional view of the sleeve in FIG. 1.
Figure 4:
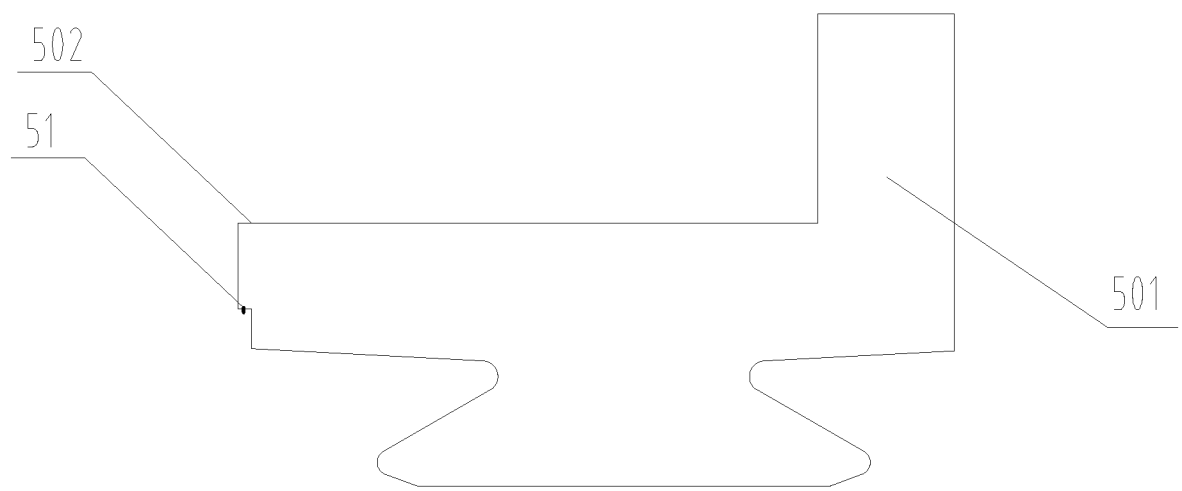
FIG. 4 is a schematic view of the commutator in FIG. 1.
Figure 5:
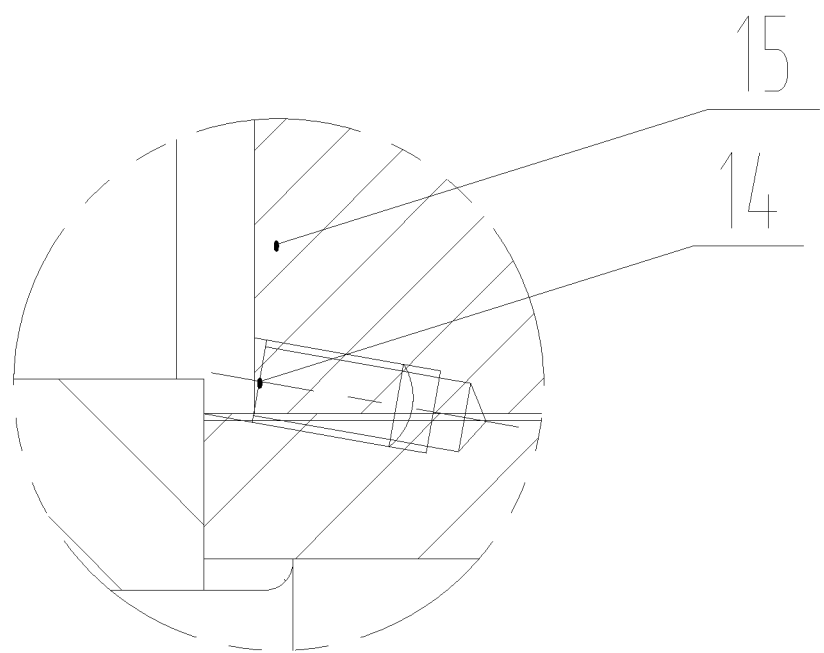
FIG. 5 is a partially enlarged view of a part A in FIG. 1.

Referring to FIGS. 1-5, the present embodiment provides a direct-current motor commutator structure, comprising:

a commutator base, comprising a front pressing ring 12, a pressing plate 7 and a sleeve 1 that are abutted in sequence, a sealing ring 6 being provided at the abutment between the front pressing ring 12 and the pressing plate 7, and at the abutment between the pressing plate 7 and the sleeve 1, and the pressing plate 7 and the sleeve 1 constituting a bearing area;

a commutator 5, mounted in the bearing area and having a first portion 501 and a second portion 502 that are opposite to each other, wherein the first portion 501, the pressing plate 7 and the front pressing ring 12 form a first potting area 8 in a surrounding manner, and a sealing element is potted or provided between the second portion 502 and the sleeve 1;

an equalizing cable 9, mounted on an outer side of the first potting area 8, the equalizing cable 9 abutting against the first portion 501 and the front pressing ring 12 and covering the first potting area 8, and the equalizing cable 9 and the front pressing ring 12 forming a second potting area 11 in a surrounding manner; and an armature coil 13, clinging to the equalizing cable 9 and located on an outer side of the second potting area 11.

In the above, the pressing plate 7 and the sleeve 1 are connected by a bolt 2 that causes the sleeve 1 to press against the pressing plate 7.

In the above, providing a sealing ring 6 at the abutment between the front pressing ring 12 and the pressing plate 7 and at the abutment between the pressing plate 7 and the sleeve 1 makes it possible to realize the sealing between the components by means of the deformation of the sealing ring 6, and a rubber sealing ring 6 with good plasticity is generally selected.

Specifically, the first portion 501 comprises a mounting groove, and the equalizing cable 9 and the armature coil 13 are sequentially pressed into the mounting groove and are sequentially welded. In this way, the contact resistance between the wires can be reduced, and at the same time, the tiny gaps between the conductors can be blocked to facilitate subsequent potting.

In the above, the gaps of the first potting area 8, the second potting area 11 and the equalizing cable 9 are all potted with a filling material (Class H), and as to the filling materials, reference may be made to common potting materials for motors.

Specifically, the direct-current motor commutator structure comprises a pressing assembly comprising a nut 15 and a stop screw 14, the nut 15 is configured to press the front pressing ring 12 towards a rotor core 10 of the direct-current motor, and the stop screw 14 is disposed on one side of the nut 15 away from the rotor core 10.

In the above, when a sealing element is provided between the second portion 502 and the sleeve 1, the sealing element is a polytetrafluoroethylene sealing element 4. If potting is adopted, appropriate tooling can be added to assist the potting, and in this embodiment, the way of using a sealing element is employed.

Specifically, the second portion 502 comprises a first boss 51, the sleeve 1 comprises a second boss 101, the first boss 51 and the second boss 101 are adjacent to each other and have a spacing therebetween, and the sealing element fills up the spacing. The first boss 51 and the second boss 101 facilitate the clamping of the sealing element and prevent the sealing element from falling off.

By potting the first potting area 8 and the second potting area 11, in cooperation with the sealing ring 6 provided at the abutment between the front pressing ring 12 and the pressing plate 7 and at the abutment between the pressing plate 7 and the sleeve 1, and the polytetrafluoroethylene sealing element 4, it is possible to construct a sealing chain at the junction between the commutator 5 and the sleeve 1 and between the commutator 5 and the front pressing ring 12, which can highly effectively prevent dust and dirt accumulation on the commutator 5.

In addition, the armature coil 13 is proximate to the front pressing ring 12, the armature coil 13 and the front pressing ring 12 have a gap therebetween, and the direct-current motor commutator structure further comprises an arc-shaped insulation 16 that is disposed in the gap and separates the armature coil 13 from the front pressing ring 12. In this way, it is possible to further enhance the protection against dust and dirt accumulation, and avoid many problems caused by dust and dirt accumulation.

Specifically, the direct-current motor commutator structure further comprises a balancing block 3, the balancing block 3 is disposed on the sleeve 1, and the balancing block 3 is located at a portion of the sleeve 1 where the second boss 101 is disposed, and located on one side of the sleeve 1 away from the sealing element. In detail, the motor components are not always symmetrical in the armature circumferential direction during machining and assembly, the rotation of the armature will cause vibration and noise, and by providing the balancing block 3, it is possible to reduce, or even eliminate, the vibration caused by armature dynamic balance. In the figures, the balancing block 3 is located below the sleeve 1.

Specifically, an outer surface of the commutator 5 has a groove 52. This is because carbon powder frequently accumulates on the surface of the commutator 5 during the operation of the carbon brush, which tends to cause electric discharge of the electric brush and cause sparks, and electric sparks may accelerate the friction between the electric brush and the commutator 5, and even burn the motor.

Optionally, a plurality of grooves 52 are provided in an extending direction of the outer surface of the commutator 5; and further, the plurality of grooves 52 are disposed at equal intervals.

By providing the grooves 52 in the outer surface (the entire surface) of the commutator 5, the ground carbon powder will be discharged into the grooves 52, which can effectively reduce the risk of electric sparks of the direct-current motor. Moreover, a plurality of grooves 52 are provided, and the plurality of grooves can ensure that the entire outer surface of the commutator 5 can receive the ground carbon powder.

Optionally, the first portion 501 and the second portion 502 are arranged in a manner of being perpendicular to each other; and one end of the second portion 502 close to the sleeve 1 is provided with a protrusion, and a clamping groove configured to be in clamping connection with the protrusion is formed between the sleeve 1 and the pressing plate 7. By means of the clamping connection between the protrusion of the second portion and the clamping groove formed between the sleeve and the pressing plate, it is possible to ensure stability of the commutator 5.

Further, the protrusion has a trapezoid-shaped section, and the clamping groove is mated with the trapezoid-shaped protrusion to be in clamping connection. Since the two side edges of the trapezoidal structure are arranged in an inclined manner and the two ends of the trapezoidal structure have different areas, when the protrusion of the trapezoidal structure is connected to the entire second portion, the protrusion serves as a fixed position, and when the protrusion is mated with the clamping groove to be in clamping connection, it is possible to ensure that the commutator 5 is more stable when rotating.

For the sake of more fitting connection between the protrusion and the groove, a rounded transition may be provided at the junction between the protrusion and the first portion; and further, the four end points of the trapezoid-shaped protrusion may be all provided with rounded corners for transition, and a fitting groove may be correspondingly provided at a position of the clamping groove corresponding to the rounded corner, so as to form more fitting abutting between the clamping groove and the protrusion.

The principle of this embodiment is as follows:

The prior art method of preventing dust and dirt accumulation is still not ideal in practical application, because it fails to completely prevent dust and dirt from entering and accumulating in the gaps. In addition, the accumulation of carbon powder resulting from the operation of the carbon brush is also a large source of dust and dirt, which will also cause the electric discharge of the carbon brush. These will all threaten the safe operation of the commutator 5 and even directly damage the commutator 5, thereby affecting the operation of the direct-current motor.

In the present embodiment, a direct-current motor commutator structure is designed to solve the above problems.

Specifically, when the direct-current motor commutator structure is mounted inside a direct-current motor, the front pressing ring 12 is abutted and pressed against one side of the rotor core 10 of the direct-current motor by a nut 15, and then the nut 15 is held with a stop screw 14, thereby preventing the nut 15 from being unscrewed along the thread during daily operation of the direct-current motor, which ensures that the position of the front pressing ring 12 is fixed.

Further, the pressing plate 7 is abutted against the front pressing ring 12, and the sleeve 1 is connected to the pressing plate 7 by a bolt 2, thereby forming a stable and reliable commutator base; and the pressing plate 7 and the sleeve 1 form a bearing area of the commutator 5.

Such a stable structure also enables the sealing ring 6 to be always under a stable compressing effect, thereby ensuring that the deformation thereof can be maintained and finally ensuring the sealing effect thereof.

Further, after the commutator 5 is mounted, in cooperation with other structural components to be mounted, such as the equalizing cable 9 and the armature coil 13, a first potting area 8 and a second potting area 11 are formed. Here, the equalizing cable 9 and the armature coil 13 are sequentially pressed into the mounting groove to be mounted and fixedly connected, preferably by welding, which can block the tiny gaps between the conductors, and also effectively helps the potting of the first potting area 8 and the second potting area 11.

With the cooperation of such a structure, the first potting area 8 and the second potting area 11 are potted so that the side where the first portion 501 of the commutator 5 is located is sealed well, the sealing of the side where the second portion 502 is located is ensured by the polytetrafluoroethylene sealing element 4, so that the two sealing rings 6, the polytetrafluoroethylene sealing element 4, the first potting area 8 and the second potting area 11 are finally constructed into a sealing chain, so that the connection between the commutator 5 and the sleeve 1 and between the commutator 5 and the front pressing ring 12 is reliable and no gap is formed, which avoids dust and dirt accumulation and thereby avoids the hazard caused by the ionization of dust and dirt.

In addition, since the surface of the commutator 5 is provide with the groove 52, the carbon powder generated by the carbon brush can be prevented from accumulating on the surface of the commutator 5, which prevents the generation of electric sparks, further prevents damages to the commutator 5, and the commutator 5 is very practical.

Embodiment 2

An embodiment of the present disclosure provides a direct-current motor, comprising the direct-current motor commutator structure in embodiment 1.

As to other structures and components of the direct-current motor, reference may be made to the direct-current motor in the prior art, and no further description will be made herein.

By using the direct-current motor commutator structure in embodiment 1, the direct-current motor can avoid failure in operation due to the damage of the commutator 5, and can have better stability in daily operation.

In summary, in the direct-current motor commutator structure of the present disclosure, the fastening effect of the front pressing ring 12 can be ensured by a nut 15 and a stop screw 14, moreover, a sealing chain is constructed by two sealing rings 6, a polytetrafluoroethylene sealing element 4, a first potting area 8 and a second potting area 11, which effectively prevents dust and dirt accumulation, and further, a groove 52 is provided on the surface of the commutator 5, which effectively reduces electric sparks of the direct-current motor, so that the direct-current motor employing the direct-current motor commutator structure can have better working performance.

The descriptions above are only preferred embodiments of the present disclosure, which are not configured to limit the present disclosure. For a person skilled in the art, the present disclosure may have various changes and variations. Any modifications, equivalent substitutions, improvements etc. within the spirit and principle of the present disclosure shall all be included in the scope of protection of the present disclosure.

INDUSTRIAL APPLICABILITY

The direct-current motor commutator structure and the direct-current motor provided in the embodiments of the present disclosure can effectively prevent dust and dirt accumulation on the commutator, and reduce electric sparks of the direct-current motor, so that the direct-current motor employing the direct-current motor commutator structure can have better working performance.

The invention claimed is:

1. A direct-current motor commutator structure, comprising:

a commutator base, comprising a front pressing ring, a pressing plate and a sleeve that are abutted in sequence, a sealing ring being provided at the abutment between the front pressing ring and the pressing plate, and at the abutment between the pressing plate and the sleeve, and the pressing plate and the sleeve constituting a bearing area;

a commutator, mounted in the bearing area and having a first portion and a second portion that are opposite to each other, wherein the first portion, the pressing plate and the front pressing ring form a first potting area in a surrounding manner, and a sealing element is potted or provided between the second portion and the sleeve;

an equalizing cable, mounted on an outer side of the first potting area, the equalizing cable abutting against the first portion and the front pressing ring and covering the first potting area, and the equalizing cable and the front pressing ring forming a second potting area in a surrounding manner; and an armature coil, clinging to the equalizing cable and located on an outer side of the second potting area.

2. The direct-current motor commutator structure according to claim 1, wherein the direct-current motor commutator structure comprises a pressing assembly comprising a nut and a stop screw, the nut is configured to press the front pressing ring towards a rotor core of a direct-current motor, and the stop screw is disposed on one side of the nut away from the rotor core.

3. The direct-current motor commutator structure according to claim 1, wherein in the case where a sealing element is provided between the second portion and the sleeve, the sealing element is a polytetrafluoroethylene sealing element.

4. The direct-current motor commutator structure according to claim 3, wherein the second portion comprises a first boss, the sleeve comprises a second boss, the first boss and the second boss are adjacent to each other and have a spacing therebetween, and the sealing element fills up the spacing.

5. The direct-current motor commutator structure according to claim 4, wherein the direct-current motor commutator structure further comprises a balancing block, the balancing block is disposed on the sleeve, and the balancing block is located at a portion of the sleeve where the second boss is disposed, and located on one side of the sleeve away from the sealing element.

6. The direct-current motor commutator structure according to claim 1, wherein an outer surface of the commutator has a groove.

7. The direct-current motor commutator structure according to claim 6, wherein a plurality of grooves are provided in an extending direction of the outer surface of the commutator.

8. The direct-current motor commutator structure according to claim 7, wherein the plurality of grooves are disposed at equal intervals.

9. The direct-current motor commutator structure according to claim 1, wherein the first portion comprises a mounting groove, and the equalizing cable and the armature coil are sequentially pressed into the mounting groove and are sequentially fixedly connected.

10. The direct-current motor commutator structure according to claim 9, wherein the equalizing cable and the armature coil are sequentially pressed into the mounting groove and are sequentially welded.

11. The direct-current motor commutator structure according to claim 1, wherein the armature coil is proximate to the front pressing ring, the armature coil and the front pressing ring have a gap therebetween, and the direct-current motor commutator structure further comprises an arc-shaped insulation that is disposed in the gap and separates the armature coil from the front pressing ring.

12. The direct-current motor commutator structure according to claim 1, wherein the pressing plate and the sleeve are connected by a bolt that causes the sleeve to press against the pressing plate.

13. The direct-current motor commutator structure according to claim 1, wherein the first portion and the second portion are arranged in a manner of being perpendicular to each other.

14. The direct-current motor commutator structure according to claim 1, wherein one end of the second portion close to the sleeve is provided with a protrusion, and a clamping groove configured to be in clamping connection with the protrusion is formed between the sleeve and the pressing plate.

15. The direct-current motor commutator structure according to claim 14, wherein the protrusion has a trapezoid-shaped section, and the clamping groove is mated with the trapezoid-shaped protrusion to be in clamping connection.

16. The direct-current motor commutator structure according to claim 15, wherein the junction between the protrusion and the first portion is provided with a rounded transition.

17. The direct-current motor commutator structure according to claim 15, wherein four end points of the trapezoid-shaped protrusion are all provided with rounded corners for transition.

18. A direct-current motor, comprising the direct-current motor commutator structure according to claim 1.

19. A method of mounting a direct-current motor commutator structure, comprising steps of:
making a front pressing ring abut and press against one side of a rotor core of a direct-current motor;
making a pressing plate abut against the front pressing ring;
connecting a sleeve to the pressing plate by a bolt;
forming, after the mounting of a commutator, a first potting area and a second potting area by the commutator in cooperation with an equalizing cable and an armature coil that are mounted; and
potting the first potting area and the second potting area.

20. The method of mounting a direct-current motor commutator structure according to claim 19, wherein the step of making the front pressing ring abut and press against one side of the rotor core of the direct-current motor further comprises:
making the front pressing ring abut and press against one side of the rotor core of the direct-current motor by a nut, and holding the nut with a stop screw.

* * * * *